US008931459B2

(12) United States Patent
Sotiriades

(10) Patent No.: US 8,931,459 B2
(45) Date of Patent: Jan. 13, 2015

(54) SYSTEM AND METHOD FOR CONTROLLING EVAPORATIVE EMISSIONS

(75) Inventor: Aleko D. Sotiriades, Cedarburg, WI (US)

(73) Assignee: Kohler Co., Kohler, WI (US)

( * ) Notice: Subject to any disclaimer, the term of this patent is extended or adjusted under 35 U.S.C. 154(b) by 1214 days.

(21) Appl. No.: 12/646,247

(22) Filed: Dec. 23, 2009

(65) Prior Publication Data

US 2011/0146630 A1 Jun. 23, 2011

(51) Int. Cl.
F02M 33/02 (2006.01)
F16K 24/00 (2006.01)
F02M 25/08 (2006.01)
F16K 11/044 (2006.01)
F01M 13/00 (2006.01)
F02M 25/06 (2006.01)
F02M 37/00 (2006.01)

(52) U.S. Cl.
CPC .......... F02M 25/0836 (2013.01); F16K 11/044 (2013.01); F01M 13/00 (2013.01); F02M 25/06 (2013.01); F02M 37/0082 (2013.01)
USPC ........... 123/520; 123/516; 123/574; 137/588; 137/589

(58) Field of Classification Search
USPC .......... 123/518–520, 516, 574; 137/109, 110, 137/587–589
See application file for complete search history.

(56) References Cited

U.S. PATENT DOCUMENTS 2,907,627 A 10/1959 Cummings
3,049,261 A * 8/1962 Wade et al. .................... 220/216
3,517,654 A * 6/1970 Sarto et al. .................... 123/518

(Continued)

FOREIGN PATENT DOCUMENTS

CN 201041103 Y 3/2008
EP 0356621 A1 3/1990

(Continued)

OTHER PUBLICATIONS

Notification Concerning Transmittal of International Preliminary Report on Patentability, Written Opinion of International Searching Authority and International Search Report; International Application No. PCT/US2010/060682; Jul. 5, 2012; 12 pages.

(Continued)

Primary Examiner — Mahmoud Gimie
Assistant Examiner — David Hamaoui
(74) Attorney, Agent, or Firm — Whyte Hirschboeck Dudek S.C

(57) ABSTRACT

Disclosed herein is a system and method for controlling evaporative emissions in an internal combustion engine. A control valve assembly having a valve housing having an inlet portion, a first outlet portion and a second outlet portion, and a vapor chamber is provided. The vapor chamber is situated within the housing and is in communication with the inlet portion, first outlet portion and second outlet portion. The assembly is configured to receive fuel vapors from a fuel vapor source, through the inlet portion into the valve chamber. The assembly is further configured to selectively actuate a piston member situated at least partially inside the valve chamber for communicating the fuel vapors in the vapor chamber to either: (i) at least one of the atmosphere and an engine air inlet system via the second outlet portion when the engine is operating or otherwise engaged to be operated, or (ii) to a crankcase of the engine via the first outlet portion when the engine is not operating.

23 Claims, 2 Drawing Sheets

(56) References Cited

U.S. PATENT DOCUMENTS

| | | | |
|---|---|---|---|
| 3,650,256 A | | 3/1972 | Marshall |
| 3,673,997 A | | 7/1972 | Sawada |
| 3,675,634 A | | 7/1972 | Tatsutomi |
| 3,695,376 A | | 10/1972 | Fiedler et al. |
| 3,779,224 A | | 12/1973 | Tagawa et al. |
| 3,910,303 A | * | 10/1975 | Rydberg ............... 137/112 |
| 4,178,894 A | | 12/1979 | Nau |
| 4,249,669 A | | 2/1981 | Szego |
| 4,395,991 A | * | 8/1983 | Miyachi et al. ............... 123/520 |
| 4,924,911 A | * | 5/1990 | Schmalenbach et al. .. 137/625.5 |
| 5,056,493 A | | 10/1991 | Holzer |
| 5,189,991 A | * | 3/1993 | Humburg ............... 123/41.1 |
| 6,161,424 A | | 12/2000 | Kidokoro et al. |
| 6,234,202 B1 | * | 5/2001 | Grill ............... 137/596.17 |
| 2007/0006852 A1 | | 1/2007 | Schondorf |
| 2007/0079814 A1 | | 4/2007 | Rado et al. |
| 2008/0283127 A1 | | 11/2008 | Wang et al. |
| 2009/0056680 A1 | * | 3/2009 | Hill et al. ............... 123/520 |
| 2009/0206081 A1 | | 8/2009 | Snyder et al. |

FOREIGN PATENT DOCUMENTS

| | | |
|---|---|---|
| JP | 50042121 U | 4/1975 |
| JP | 55005465 A | 1/1980 |
| JP | 58174150 A | 10/1983 |

OTHER PUBLICATIONS

Aulich, T.R.; et al.; "Gasoline evaporation—Ethanol and Nonethanol blends"; Energy & Environmental Research Center, Grand Forks, ND, ISSN; 1047-3289, J. Air & Waste Manage.Assoc. 44: 1004-1009; 1994.

Chinese Patent Application No. 201080056735.6; Notification of First Office Action; Nov. 15, 2013; 6 pages.

European Patent Application No. 10796559.2, Notification of office action dated Oct. 1, 2013; 6 pages.

* cited by examiner

US 8,931,459 B2

SYSTEM AND METHOD FOR CONTROLLING EVAPORATIVE EMISSIONS

FIELD OF THE INVENTION

The present invention relates to evaporative emission systems and, more particularly, to evaporative emission systems for use with an internal combustion engine.

BACKGROUND OF THE INVENTION

As is commonly known, liquid fuel stored in a fuel reservoir emits fuel vapors when the liquid fuel is converted to a gas, typically during evaporation. An evaporative emission system is commonly used to reduce or recycle the fuel vapors that are vented from a fuel tank that supplies liquid fuel to a vehicle engine.

In addition, certain states, including California, require evaporative controls for some engines, such as small off-road engines (SORE). Fuel vapors generated in a fuel tank (and/or carburetor) can be forced by expansion to exit the fuel tank. Traditionally, these vapors have been routed through a length of tubing to a carbon canister, which is a structure that contains a fuel vapor absorbing material (e.g., charcoal) where the vapors can be trapped and/or absorbed. When the engine is subsequently operated the carbon canister is flushed with air to remove the absorbed fuel vapors from the carbon canister and the vapors are then pulled into the engine intake system to be burned.

Although the carbon canister can effectively absorb and release vapors they have numerous drawbacks. In particular, carbon canisters can be costly to purchase and maintain on a vehicle, and they can be difficult to mount on a vehicle in an efficient and aesthetic manner.

In addition, most vehicles utilize a roll-over valve to prevent the inadvertent flow of fuel from a fuel tank, such as through the carbon canister, when the vehicle is overturned. This configuration adds an additional component that must then be separately mounted to the vehicle along with additional tubing and fittings.

Accordingly, it would be desirable to provide an evaporative emission system that overcomes at least some of the aforementioned shortcomings.

BRIEF SUMMARY OF THE INVENTION

In accordance with at least some embodiments, the present invention relates to a method for controlling evaporative emissions in an internal combustion engine. The method includes providing a control valve assembly with a valve housing that includes an inlet portion, a first outlet portion and a second outlet portion, and a vapor chamber situated within the housing that is in communication with the inlet portion, first outlet portion and second outlet portion. The method further includes receiving fuel vapors from a fuel vapor source, through the inlet portion into the valve chamber. And the method still further includes selectively actuating a piston member situated at least partially inside the valve chamber for communicating the fuel vapors in the vapor chamber to either at least one of the atmosphere and an engine air inlet system via the second outlet portion when the engine is operating or otherwise engaged to be operated, or to a crankcase of the engine via the first outlet portion when the engine is not operating. In other embodiments, the method further includes, ceasing communication via the first outlet portion while simultaneously allowing communication via the second outlet portion, or allowing communication via the first outlet portion while simultaneously ceasing communication via the second outlet portion. In other embodiments, the method also includes, actuating a piston actuating portion of the piston member that is situated exterior to the vapor chamber.

In other embodiments, the present invention relates to a control valve assembly and a control valve assembly in combination with an internal combustion engine. In accordance with at least some embodiments, the control valve assembly includes a valve housing that includes a vapor chamber therein, a first inlet portion situated about the valve housing for communicating fuel vapors to the vapor chamber, and a first outlet portion situated about the valve housing for providing communication between the vapor chamber and an engine crankcase. The control valve assembly further includes, a second outlet portion situated about the valve housing for providing communication between the vapor chamber and at least one of the atmosphere and an engine air inlet system, and a piston member having a piston sealing portion and a piston actuating portion, with the piston sealing portion including a first sealing assembly and a second sealing assembly. In addition, when the piston sealing portion is in a first position the second sealing assembly substantially prevents the communication of fuel vapors between the vapor chamber and at least one of the atmosphere and the engine air inlet system, and when the piston member is in a second position the first sealing assembly substantially prevents the communication of fuel vapors between the vapor chamber and the crankcase.

Other embodiments, aspects, features, objectives and advantages of the present invention will be understood and appreciated upon a full reading of the detailed description and the claims that follow.

BRIEF DESCRIPTION OF THE DRAWINGS

Embodiments of the invention are disclosed with reference to the accompanying drawings and are for illustrative purposes only. The invention is not limited in its application to the details of construction or the arrangement of the components illustrated in the drawings. The invention is capable of other embodiments or of being practiced or carried out in other various ways. The drawings illustrate a best mode presently contemplated for carrying out the invention. Like reference numerals are used to indicate like components. In the drawings.

DETAILED DESCRIPTION

Figure 1:
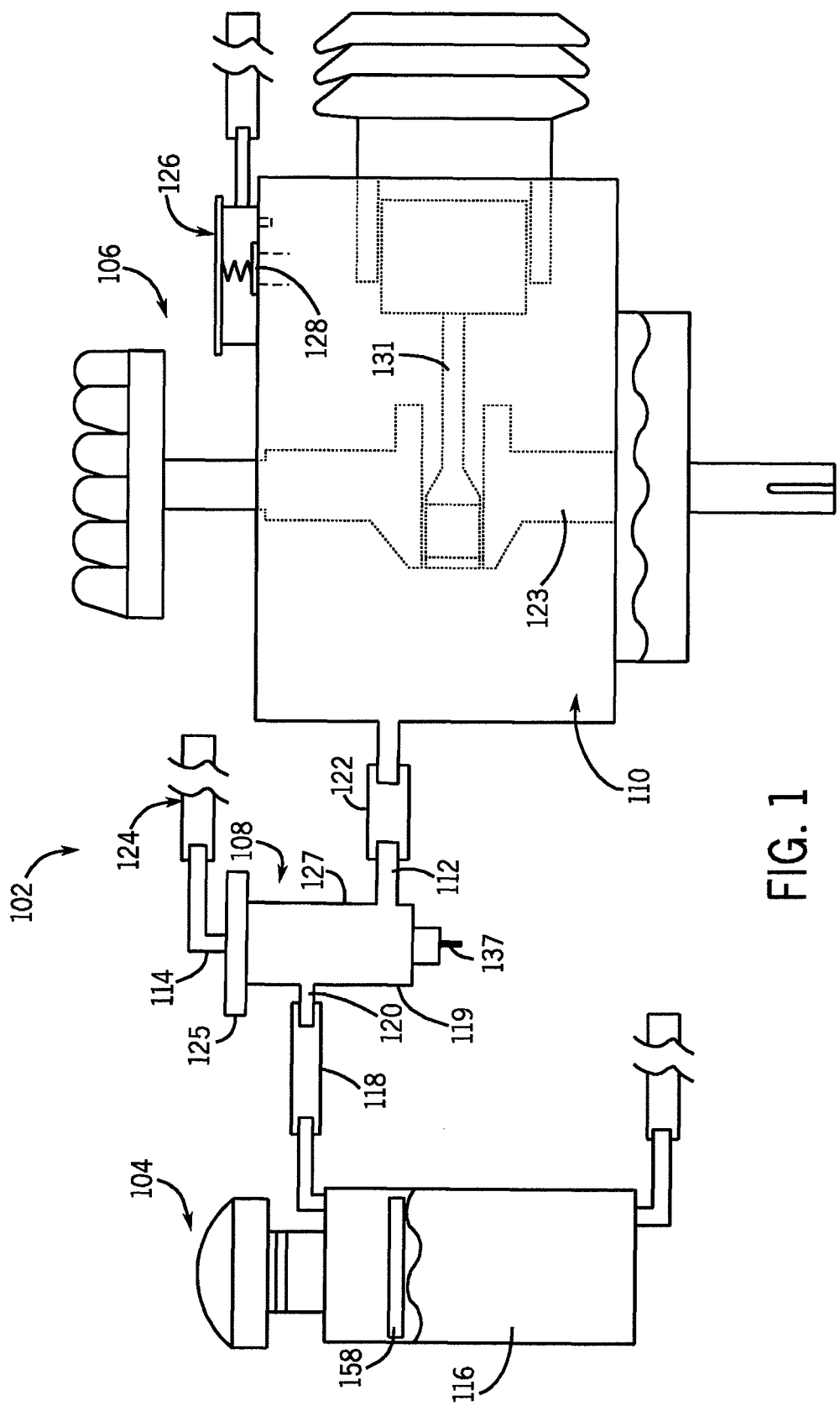
FIG. 1 is a side perspective view of an evaporative emission system in conjunction with a fuel reservoir assembly and an engine, in accordance with at least some embodiments of the present invention.

Referring to FIG. 1, an evaporative emission system 102 is shown along with a fuel reservoir assembly 104 and an internal combustion engine 106 in accordance with various embodiments. The evaporative emission system 102 in the present embodiment utilizes a single control valve assembly 108 to communicate fuel vapors from the fuel reservoir assembly 104 to an engine crankcase 110 via a first outlet portion 112 of the control valve assembly 108 when the engine 106 is not in operation. Storing the fuel vapors in the crankcase 110 eliminates the additional space and cost requirements associated with utilizing a separate fuel vapor storage device. When the engine is put into operation, the control valve assembly 108 is actuated, where the actuation switches the communication of fuel vapors from the crankcase 110 to at least one of an engine air inlet system (not shown) and the atmosphere.

Still referring to FIG. 1, the fuel reservoir assembly 104 can include any of a variety of typical fuel reservoir assemblies, such as a land based vehicle fuel tank, that serves to store fuel for supply to an internal combustion engine. The reservoir assembly 104 includes a fuel chamber 116 for housing liquid fuel. Fuel vapors generated in the fuel chamber 116 are allowed to vent through an inlet passage 118 from the fuel chamber to the control valve assembly 108 for further dispersion. The control valve assembly 108 includes a valve housing 119 having an inlet portion 120 that is in communication with the inlet passage 118. The valve housing 119 can generally include various shapes to accommodate the intended application, and the various shapes will be apparent to one skilled in the art. Further, the valve housing 119 includes a first outlet portion 112 and a second outlet portion 114. The first outlet portion 112 is in communication with the engine crankcase 110 via a first outlet passage 122, such that fuel vapors can pass from the control valve assembly 108 to the crankcase 110. The second outlet portion 114 communicates fuel vapors from the control valve assembly 108 along a second outlet passage 124. Fuel vapors passing through the second outlet passage 124 can pass to the engine air inlet system and/or the atmosphere, as desired. Additional components, such as flexible rubber tubing, rigid metal tubing, cast pathways, etc., can be used with the inlet passage 118 and the first and second outlet passages 122, 124. In addition, at least one embodiment, the valve housing 119 can include a top section 125 and a bottom section 127, wherein the sections 125, 127 are assembled together at a junction 129 after installation of the internal components (discussed below).

The engine crankcase 110 provides a substantial unused volume which can be capitalized for storing fuel vapors during non-operational periods of the engine 106. In at least some embodiments, the evaporative emission system 102 can be used in the Courage family of vertical crankshaft engines available by the Kohler Company of Kohler, Wis. Notwithstanding the fact that in the present embodiment, the engine 106 is a vertical crankshaft engine, it will be understood that in other embodiments, the evaporative emission system 102 can be employed with horizontal crankshaft engines as well including, the Courage family of horizontal crankshaft engines, also available from the Kohler Company. In alternate embodiments, the evaporative emission system 102 can be employed in other types of engines as well.

In particular, the internal combustion engine 106 can be any of a wide variety of engines. For example, some embodiments of the present invention can be employed in conjunction with SORE engines including Class 1 and Class 2 small off-road engines such as those implemented in various machinery and vehicles, including, for example, lawn movers, air compressors, and the like. Indeed, in at least some such embodiments, the present invention is intended to be applicable to "non-road engines" as defined in 40 C.F.R. §90.3, which states in pertinent part as follows: "Non-road engine means . . . any internal combustion engine: (i) in or on a piece of equipment that is self-propelled or serves a dual purpose by both propelling itself and performing another function (such as garden tractors, off-highway mobile cranes, and bulldozers); or (ii) in or on a piece of equipment that is intended to be propelled while performing its function (such as lawnmowers and string trimmers); or (iii) that, by itself or in or on a piece of equipment, is portable or transportable, meaning designed to be and capable of being carried or moved from one location to another. Indicia of transportability include, but are not limited to, wheels, skids, carrying handles, dolly, trailer, or platform."

In the present embodiment, the engine crankcase 110 is situated in a small off-road engine (SORE), although in other embodiments, the crankcase of any one of numerous other types of engines can be utilized, as discussed above. It is to be understood that the engine crankcase 110 can substantially enclose numerous engine components, such as a crankshaft 123 and a connecting rod 131. Initially, the crankcase 110 is substantially filled with air, although the fuel vapors communicated to the crankcase 110 from the control valve assembly 108 will displace the air inside the crankcase 110 through the oil vapor breather system (discussed below). Once the fuel vapors are communicated to the crankcase 110, the fuel vapors are substantially contained within the crankcase until the engine is operated. In addition, in the present embodiment, an oil vapor breather system 126 having a breather valve 128 is provided in communication with the crankcase 110. The breather valve opens when the pressure inside the crankcase 110 exceeds a set limit, such as >=0.25 oz/square-inch, as such, this release of pressure can prevent damage to the sealing components of the crankcase.

Figure 2:
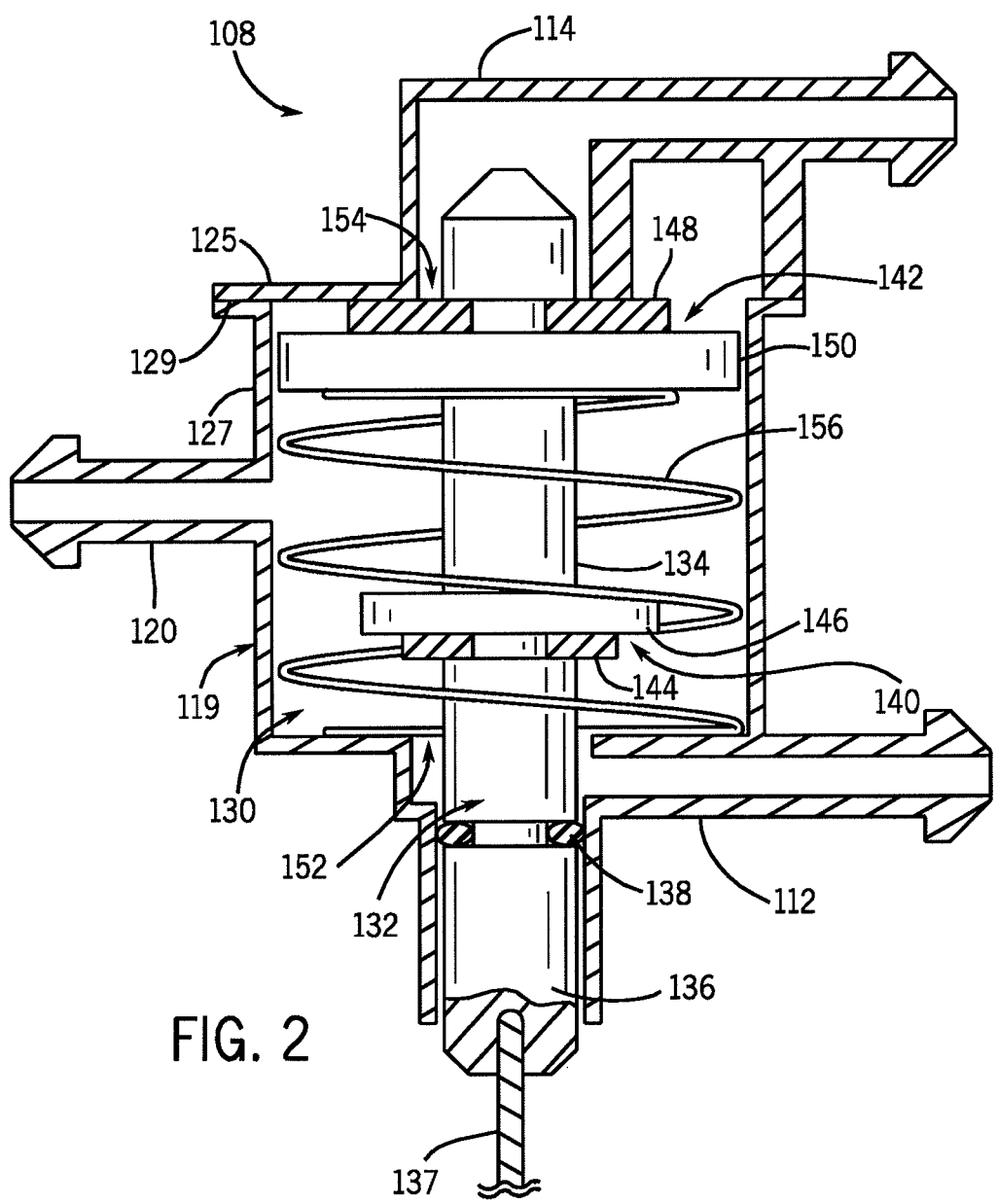
FIG. 2 is a perspective view of a control valve assembly, in accordance with at least some embodiments of the present invention.

Referring now to FIG. 2, the exemplary control valve assembly 108 of FIG. 1 is shown, which includes the housing 119 having a vapor chamber 130 situated therein, where the vapor chamber 130 serves as a transfer point for fuel vapors received from the inlet portion 120 to at least one of the first and second outlet portions 112, 114. The control valve assembly 108 further includes a piston member 132 having a piston sealing portion 134 and a piston actuating portion 136. In the present embodiment, the piston sealing portion 134 is housed in the vapor chamber 130 to selectively divert the fuel vapors to one of the first and second outlet portions 112, 114, as governed by the current engine state (i.e. operational or non-operational), as discussed above. The piston actuating portion 136 is situated substantially outside the vapor chamber 130 and is actuated to move the piston sealing portion 134 to the desired position. In the present embodiment, the piston actuating portion 136 is rigidly connected to or formed therewith the piston sealing portion 134, although in other embodiments the portions 134, 136 can be interconnected in other manners, such as a linkage. The piston actuating portion 136 also includes a securing portion 137 for securing the piston actuating portion 136 to an actuator (as discussed below). In addition, a sealing member 138, such as an o-ring, is situated between the housing 119 and the piston member 132 adjacent the piston actuating portion 136 to prevent the escape of fuel vapors from the vapor chamber 130. In the present embodiment, the vapor chamber 130 is cylindrical in shape to provide a non-obstructed path for the piston sealing portion 134 to change positions in the vapor chamber 130. In other embodiments, the vapor chamber 130 can include one of several different shapes, such as a square having parallel opposing walls.

Still referring to FIG. 2, to selectively distribute fuel vapors to the outlet portions 112, 114, the piston sealing portion 134 includes a first sealing assembly 140 and a second sealing assembly 142. In the present embodiment, the first sealing assembly 140 further includes a first seal 144 and a first seal support 146, and the second sealing assembly 142 further includes a second seal 148 and a second seal support 150. The seals 144, 148 can be constructed of various materials, such as Nitrile (NBR), Neoprene, Polyvinyl chloride (PVC), Silicone, Fluorinated Silicone and other fuel resistant grade rubber materials; although in the present embodiment they are Nitrile. The seal supports 146, 150 are comprised of a rigid or semi-rigid material such as a metal alloy and are affixed to the piston member 132 so as to provide a backing/support for the seals 144, 148 thereby enabling the piston member 132 to effectively support the seals against openings in the housing (as discussed below).

In the present embodiment, the seal supports have a flat seal surface that faces the seal, although in other embodiments the seal supports can have non-flat seal surfaces to accommodate other seal shapes. The first and second sealing assemblies 140, 142 are positioned on the piston sealing portion 134 such that actuation of the piston member 132 selectively closes a first outlet chamber opening 152 that communicates with the first outlet portion 112 while simultaneously opening a second outlet chamber opening 154 that communicates with the second outlet portion 114. Although the aforementioned actuation closes the first outlet chamber opening 152 and opens the second outlet chamber opening 154, in other embodiments, the actuation can also be configured to open the first outlet chamber opening 152 while simultaneously closing the second outlet chamber opening 154. Further, in the present embodiment, a spring is provided inside the vapor chamber 130 to exert pressure on the piston member 132 during non-actuation periods (namely, when the engine is not operating) to forcibly abut the second seal 148 against the second outlet chamber opening 154. As such, the first outlet chamber opening 152 is in an open position allowing fuel vapors to pass to the crankcase 110.

In the present embodiment, the evaporative emission system 102 provides an efficient distribution of fuel vapors based on an engine's operational status, using a single control valve assembly. Further, in the present embodiment, as the control valve assembly 108 includes the piston actuating portion 136 situated outside the vapor chamber 130, the piston member 132 is actuated by a source/mechanism (not shown) that is external to the vapor chamber 130. As such, actuation can be accomplished by one or more of numerous direct and indirect actuator sources/mechanisms, for example, a cable, a rod, a vacuum source, an air-pressure source, and an electric solenoid. Positioning the piston actuating portion 136 outside the vapor chamber 130 allows for substantial versatility with regard to an actuator source/mechanism. Further, by locating the actuator source/mechanism outside the vapor chamber 130, the actuator source/mechanism is conveniently serviceable. Additionally, as the control valve assembly 108 includes a single moving piston member 132 that serves to open and close both outlet portions 112, 114, the control valve assembly 108 minimizes the number of separate movable parts required to distribute the fuel vapors accordingly. Although not discussed herein, the actuator source/mechanism can in some embodiments be located inside a portion of the housing 119, such as in the vapor chamber 130. Also, as the control valve assembly 108 communicates only fuel vapors, failure of the actuator source/mechanism and/or the control valve assembly 108, would not affect the supply of liquid fuel the engine 106.

In the present embodiment, the evaporative emission system 102 is used in conjunction with the fuel reservoir assembly 104 and the engine 106 (as seen in FIG. 1). More particularly, the vapor chamber 130 receives fuel vapors, at the inlet portion 120 of the control valve assembly 108, from the fuel reservoir assembly 104 via the inlet passage 118. If the engine is non-operational, the piston member is not actuated, and as a result of the force of the spring 156 against the second sealing assembly 142, the piston sealing portion 134 is positioned toward the second outlet portion 114. This positioning of the piston sealing portion 134 maintains the position of the second seal 148 against the second outlet chamber opening 154, thereby maintaining coverage of the opening and preventing or substantially preventing fuel vapors from exiting the vapor chamber 130 into the second outlet portion 114. In addition, the positioning of the piston member 132 situates the first seal 144 away from the first outlet chamber opening 152, thereby allowing fuel vapors in the vapor chamber 130 to flow through the first outlet portion 112 and into the crankcase 110 via the first outlet passage 122. Fuel vapors are then stored in the engine 106, as opposed to a separate additional storage device.

When the engine is put into operation, it is desirable to vent the fuel vapors into at least one of the atmosphere or the engine air inlet system. In addition, it is desirable to prevent the fuel vapors and other vapors, such as oil vapor, from being pushed from the crankcase 110 into the vapor chamber 130, and subsequently the fuel chamber 116 of the fuel reservoir assembly 104. As such, upon sensing the engine is operational, or about to be operated (such as when an ignition switch is activated), the piston member 132 is actuated. Upon actuation, the piston sealing portion 134 is shifted, against the force of the spring 156, in the direction of the first outlet portion 112. This positioning of the piston sealing portion 134 pushes the first seal 144 against the first outlet chamber opening 152, thereby covering the opening and preventing or substantially preventing fuel vapors from exiting the vapor chamber 130 into the first outlet portion 112, and preventing or substantially preventing vapors from entering the vapor chamber 130 from the crankcase 110. In addition, the positioning of the piston sealing portion 134 positions the second seal 148 away from the second outlet chamber opening 154, thereby allowing fuel vapors in the vapor chamber 130 to flow through the second outlet portion 114 and into at least one of the atmosphere or the engine air inlet system.

Further, when the engine is operational, pressure is created in the crankcase 110 by piston blow-by. This pressure pushes the previously stored fuel vapors, along with any other stored or created vapors, out of the crankcase 110 and into the oil vapor breather system 126. The vapors discharged into the oil vapor breather system 126 are then communicated to the engine air inlet system. The vapors are then burned in the engine as part of an air/fuel inlet mixture received by a carburetor (not shown). This processing of the fuel vapors allows the fuel reservoir to vent the vapors in a manner that they are efficiently contained and then eliminated by engine combustion. Upon cessation of the engine operation, the actuation of the piston member is stopped and the piston sealing portion 134 shifts back into the position previously discussed (engine not operating) under the force of the spring 156.

Regarding the capacity of an exemplary crankcase to contain the fuel vapors emitted from the fuel reservoir assembly in a SORE engine, the following calculations are provided:
 a) Molecular weight of gasoline (typical)=108 g/mole;
 b) 1 mole of gas occupies 22.4 liters of volume at standard temperature and pressure (STP);
 c) Fuel tank volume for the exemplary application=1.3 liters;
 d) Specific Density=0.8;
 e) Evaporation rate of gasoline at 70 degrees Fahrenheit=5.7%/24 hours (assuming a surface area to volume exposure ratio of 1/6);
 f) Volume of the crankcase=approximately 1 liter of air space;
 g) Calculation of the volume of gasoline vapor at STP in a 24 hours period=5.7%*1.3*0.8*108/22.4=0.29 liters.

As seen in the above calculation, since 0.29 liters is ≤1.0 liters, the crankcase is shown to have sufficient capacity to contain the fuel vapors over a 24 hour period.

Further, as the evaporation rate of liquid fuel in the fuel chamber 116 (FIG. 1) is proportional to the amount of fuel vapors generated, reducing the evaporation rate acts to lower the amount of space in the crankcase 110 required for fuel vapor containment. As such, in at least some embodiments, the evaporative emission system 102 includes a membrane 158 (shown in FIG. 1) situated in the fuel chamber 116. The membrane 158 floats substantially about the exposed surface of the liquid fuel and is sized to substantially cover the exposed surface. The membrane 158 is a singular component comprised of one or more of numerous types of material that are substantially impervious to, and will substantially float on or substantially about, liquid fuel. In addition, the membrane 158 resists the passage of air therethrough. In a situation where the fuel reservoir assembly 104 (except for the inlet passage 118), and the engine crankcase 110 are sealed until the breather valve 128 opens under pressure (as described above), the evaporation of the liquid fuel can be substantially reduced by utilizing the combination of the control valve assembly 108 and the membrane 158.

In addition to the control valve assembly 108 as described above, in at least one embodiment, the evaporative emission system 102 includes a roll-over valve (not shown) situated in at least one of the inlet passage 118 or otherwise incorporated into the control valve assembly 108. The incorporation of a roll-over valve into the control valve assembly 108 provides a singular compact multi-purpose device.

Despite any methods being outlined in a step-by-step sequence, the completion of acts or steps in a particular chronological order is not mandatory. Further, modification, rearrangement, combination, reordering, or the like, of acts or steps is contemplated and considered within the scope of the description and claims.

It is specifically intended that the present invention not be limited to the embodiments and illustrations contained herein, but include modified forms of those embodiments including portions of the embodiments and combinations of elements of different embodiments as come within the scope of the following claims.

I claim:

1. A method for controlling evaporative emissions in an internal combustion engine, the method comprising:

providing a control valve assembly with a valve housing that includes an inlet portion, a first outlet portion and a second outlet portion, a vapor chamber situated within the housing in communication with the inlet portion, first outlet portion by way of a first outlet chamber opening and second outlet portion by way of a second outlet chamber opening; a piston member having a piston sealing portion situated inside the vapor chamber and a piston actuating portion secured to the piston sealing portion and situated exterior of the vapor chamber, with the piston sealing portion including a first sealing assembly and a second sealing assembly that are each positioned at least substantially within the vapor chamber, the first sealing assembly including a part that is affixed to the piston member and the second sealing assembly including a part that is also affixed to the piston member, spaced apart from and in fixed relation to the first sealing member part, and a spring situated in the vapor chamber and configured to provide a force only toward the second outlet chamber opening;

receiving fuel vapors from a fuel vapor source, through the inlet portion into the vapor chamber; and selectively actuating the piston member to communicate the fuel vapors in the vapor chamber to at least one of the atmosphere and an engine air inlet system via the second outlet portion by positioning the part of the first sealing assembly against the valve housing to cover the first outlet chamber opening when the engine is operating or otherwise engaged to be operated, or to a crankcase of the engine via the first outlet portion by positioning, using the force of the spring that is only toward the second outlet chamber opening, the part of the second sealing assembly against the valve housing to cover the second outlet chamber opening when the engine is not operating.

2. The method of claim 1, further including ceasing communication via the first outlet portion while simultaneously allowing communication via the second outlet portion, or allowing communication via the first outlet portion while simultaneously ceasing communication via the second outlet portion.

3. The method of claim 1, wherein the actuating of the piston member includes actuating a piston actuating portion of the piston member that is situated exterior to the vapor chamber.

4. The method of claim 3, further including actuating the piston actuating portion with at least one of an electrical and mechanical actuator situated exterior to the control valve assembly.

5. The method of claim 1, further including forcibly positioning the piston member, using the spring situated in the vapor chamber, so as to cease communication via the first outlet portion while simultaneously allowing communication via the second outlet portion, or allowing communication via the first outlet portion while simultaneously ceasing communication via the second outlet portion.

6. The method of claim 1, further including controlling the evaporative emissions in a small off-road vehicle engine.

7. The method of claim 1, wherein the fuel vapor source includes a vehicle fuel tank for containing liquid fuel therein.

8. The method of claim 7, further including controlling the evaporation of liquid fuel situated in the fuel tank by floating or substantially floating a membrane on the exposed surface of the liquid fuel.

9. The method of claim 7, further including at least substantially preventing, using the control valve assembly, liquid fuel in the fuel tank from flowing into the inlet portion when the fuel tank is overturned.

10. A control valve assembly in combination with an internal combustion engine, the combination comprising:

an engine comprising:
  a crankcase; and
a control valve assembly in communication with the crankcase, the control valve assembly comprising:
  a valve housing that includes a vapor chamber therein;
  a first inlet portion situated about the valve housing for communicating fuel vapors to the vapor chamber;
  a first outlet portion situated about the valve housing for providing communication between the vapor chamber and the crankcase via a first outlet chamber opening;
  a second outlet portion situated about the valve housing for providing communication between the vapor chamber and at least one of the atmosphere and an engine air inlet system via a second outlet chamber opening; and
  a piston member having a piston sealing portion and a piston actuating portion, with the piston sealing portion including a first sealing assembly and a second sealing assembly, at least part of which is spaced apart from and in fixed relation to at least a part of the first sealing member;

wherein the first and second sealing assemblies are each positioned, along with a spring, at least substantially within the vapor chamber and wherein the spring is configured to provide a force only toward the second outlet chamber opening;

wherein, when the piston sealing portion is in a first position, the second sealing assembly substantially prevents the communication of fuel vapors between the vapor chamber and at least one of the atmosphere and the engine air inlet system, by positioning the part of the second sealing assembly against the valve housing to cover the second outlet chamber opening and when the piston member is in a second position, the first sealing assembly substantially prevents the communication of fuel vapors between the vapor chamber and the crankcase by positioning, using the force of the spring that is only toward the second outlet chamber opening, the part of the first sealing assembly against the valve housing to cover the first outlet chamber opening.

11. The combination of claim 10, wherein, when the piston sealing portion is in the first position, the first sealing assembly allows communication of fuel vapors from the vapor chamber to the crankcase, and when the piston member is in the second position, the second sealing assembly allows communication of fuel vapors from the vapor chamber to at least one of the atmosphere and the engine air inlet system.

12. The combination of claim 11, wherein the piston actuating portion selectively positions the piston member in the first position and second position.

13. The combination of claim 12, wherein the piston actuating portion is situated outside the vapor chamber and the piston sealing portion is situated inside the vapor chamber.

14. The combination of claim 13, wherein the piston actuating portion is actuated by at least one of an electrical and mechanical mechanism situated exterior to the control valve assembly.

15. The combination of claim 14, further including a spring that forcibly positions the piston member so as to open the first outlet portion and simultaneously close the second outlet portion, or to close the first outlet portion and simultaneously open the second outlet portion.

16. The combination of claim 15, wherein the engine is a small off-road vehicle engine.

17. The combination of claim 16, wherein the fuel vapors include fuel vapors from a vehicle gas tank containing liquid fuel therein.

18. The combination of claim 17, further including a membrane situated in the fuel tank that floats or substantially floats on an exposed surface of the liquid fuel therein.

19. The combination of claim 17, wherein the control valve assembly at least substantially prevents liquid fuel in the fuel tank from flowing into the inlet portion when the fuel tank is situated in an inverted or substantially inverted position.

20. An evaporative emissions system for use with an internal combustion engine comprising:
   a control valve assembly having a valve housing that includes a vapor chamber therein;
   an inlet portion extending from the vapor chamber for receiving fuel vapors from a fuel tank associated with the engine;
   a first outlet portion extending from the vapor chamber for the communication of fuel vapors in the vapor chamber to an engine crankcase when the engine is not operating;
   a second outlet portion extending from the vapor chamber for the communication of fuel vapors in the vapor chamber to at least one of the atmosphere and an engine air inlet system when the engine is operating;
   a piston member having a piston sealing portion situated inside the vapor chamber and a piston actuating portion secured to the piston sealing portion and situated exterior to the vapor chamber, with the piston sealing portion including a first sealing assembly and a second sealing assembly at least part of which is spaced apart from and in fixed relation to at least a part of the first sealing member, and
   a spring, at least substantially situated in the vapor chamber, that is configured to provide a force only toward the second outlet chamber opening:
   wherein when the piston sealing portion is in a first position, the second sealing assembly is closed, using the force of the spring that is only toward the second outlet chamber opening, upon a portion of the valve housing to close an opening to the second outlet portion, thereby preventing the communication of fuel vapors between the vapor chamber and the second outlet portion, and simultaneously, the first sealing assembly is removed from an opening to the first outlet portion, thereby allowing the communication of fuel vapors between the vapor chamber and the first outlet portion, and
   wherein when the piston sealing portion is in a second position, the first sealing assembly is closed upon a portion of the valve housing to close the opening to the first outlet portion, thereby preventing the communication of fuel vapors between the vapor chamber and the first outlet portion, and simultaneously, the second sealing assembly is removed from the opening to the second outlet portion, thereby allowing the communication of fuel vapors between the vapor chamber and the second outlet portion, and
   wherein the piston actuating portion is secured to an actuator to selectively position the piston sealing portion in at least one of the first position and second position.

21. The system of claim 20, further including a membrane situated in the fuel tank that floats or substantially floats on an exposed surface of the liquid fuel situated therein.

22. The system of claim 20, wherein the control valve assembly at least substantially prevents liquid fuel in the fuel tank from flowing into the inlet portion when the fuel tank is situated in an inverted or substantially inverted position.

23. The system of claim 20 in combination with a small off-road vehicle internal combustion engine.

* * * * *